Oct. 28, 1958 C. G. LUDEMAN 2,858,465
RADIATION DETECTORS
Filed May 14, 1953
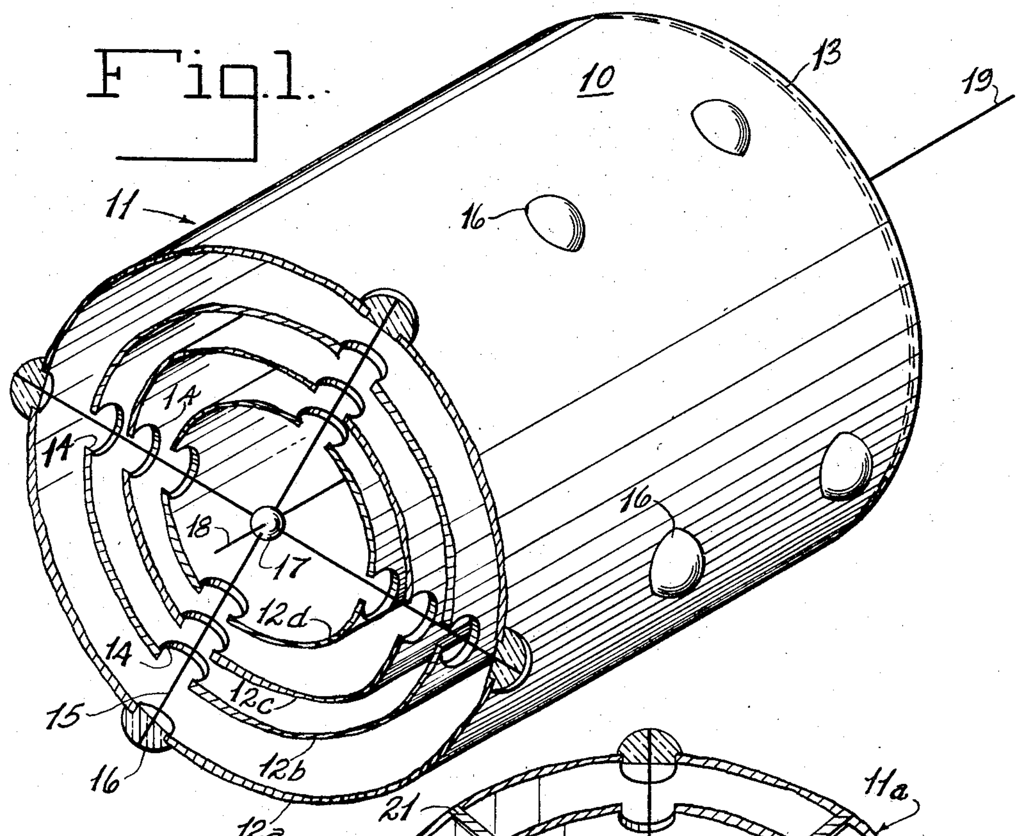
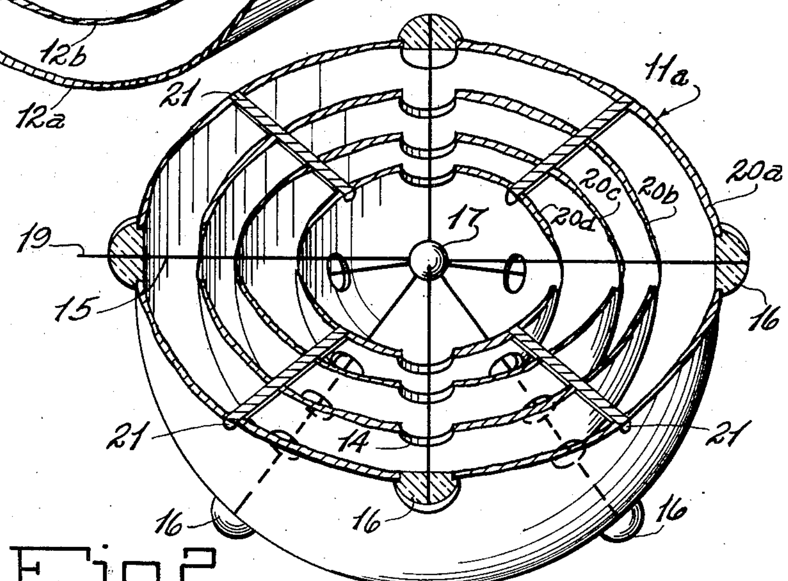

United States Patent Office 2,858,465
Patented Oct. 28, 1958

2,858,465

RADIATION DETECTORS

Clifford G. Ludeman, Scarsdale, N. Y., assignor to Texaco Development Corporation, New York, N. Y., a corporation of Delaware Application May 14, 1953, Serial No. 354,949
5 Claims. (Cl. 313—93)

This invention relates to improvements in Geiger-Mueller radiation detectors and in particular to the types thereof known as multiple plate detectors. As is known these detectors have much higher efficiencies for the detection of penetrative radiation such as gamma rays than the original or proto-type Geiger-Mueller tubes. A brief review of why this is so will be helpful in understanding the objects of the present invention and how they are attained.

The original type Geiger-Mueller tube, i. e., a tube in which a single cylindrical cathode is used which is normally positioned with its curved outer surface facing broadside to the source of radiation, does not detect more than a very small percentage of the penetrative photons which it intercepts. In general each individual case of a photon which is not detected can be attributed to one of two causes: (1) the photon simply fails to become involved in an interaction within the cathode, and therefore to produce the charged particle needed for ionizing the gaseous filling of the tube; or (2) no charged-particle which may be produced by an interaction in which it does become involved is able to escape from the cathode into the gas filled interior of the tube. The first cause is mostly responsible when the cathode wall is so thin that the average impinging photon is very likely to go right through it without having an interaction. The second cause is mostly responsible when the cathode wall is so thick that the average interaction which does take place in it is likely to occur at a greater distance from its interior surface than the penetrative range of the charged-particle(s) released by the interaction, this range always being very much smaller than that of the original photon. Since the average charged-particle by-product of the interaction of a photon is far less penetrative than the photon itself, any thickness which is right for meeting one requirement is wrong for meeting the other and therefore there is no possible wall thickness for the cathodes of these tubes at which even fairly high detection efficiencies can possibly be achieved. All that can be done is to compromise in the matter of wall thickness so as to avoid extremes in either direction and therefore such extremely poor efficiencies that the tubes become entirely useless as detectors.

Multiple plate detectors have provided a solution to this problem and great increases in detection efficiency by the use of stacked arrays of wafer-like cathode elements. Where the radiation is directed at the top or bottom of the stack so as to impinge on the surfaces of the elements successively, each photon will have repeated (though individually poor) opportunities to interact in elements which are individually thin enough so that each charged-particle by-product of any interaction will have a very good chance of escaping into gas occupying the nearest inter-element space. On the other hand where the radiation is directed at the side of the array each photon which enters an edge of any one of the cathode elements or penetrates one of its sides at a very small grazing angle, will have a single (but a very excellent)

opportunity to interact due to its continuous long path through dense material, and even its charged-particle by-product(s) will have quite a good chance of escaping because of the fact that very often such particles will move off from the interaction points in entirely different directions than extrapolations, or near-extrapolations, of the path of the original photon. Therefore multiple plate detectors have offered a type of structure which results in an increase in the percentage of interactions and at the same time permits a high percentage of the ionizing charged particles produced by the interactions to escape into the gas.

Experience has shown that, though in general it has greatly improved efficiency regardless of how it is used, the multiple-plate Geiger-Mueller tube has substantially lower detection efficiencies, particularly for certain kinds of penetrative radiation such as "natural" gamma radiation, when it impinges on one of its sides rather than on one of its ends. The reason for this is that, while, as stated above, the charged particle(s) do, indeed, often move off from the interaction point in directions markedly different than an extrapolation of the path of the penetrative radiation which produced them, yet much more often certain of them, and in particular one kind of charged particle, "Compton" electrons, which are most often produced by the interactions of natural gamma rays, will move off in directions which are not markedly different than said extrapolation (see Fig. 6.5 on page 150 in the book, "Radioactivity and Nuclear Physics" written by James M. Cork and published in 1947 by the D. Van Nostrand Co. Inc.). Thus where natural gamma rays impinge on an end of the tube the charged particles which are produced by their interactions most often move off from the interaction points in directions affording them easiest escape paths from the stacked cathode elements whereas the converse is true where the impingement is on a side of the tube.

For certain purposes this is not particularly important. For example, in medical uses of multiple plate detectors the operator is free to orient the instrument with respect to the source of radiation so as to obtain the highest efficiency. For other purposes this characteristic of multiple plate detectors has proven to be disadvantageous. For example, when such a detector is used in logging a bore hole the geometry of the hole and of the logging tool virtually necessitate mounting the detector so that the impingement of radiation is against its sides. From the foregoing it would seem advantageous to provide multiple-plate detector cathode-arrays comprising concentric cylinders rather than stacked planar elements. In fact some such detectors have already been proposed in the past. In some instances foraminous cathode cylinders were proposed to make it possible for charged particles to move from the inner surfaces of outer ones through the walls of intermediate ones to reach a central anode wire, i. e., to avoid physical blocking of the paths of charged particles, these proposals of course involving the use of cascade polarization of the successive cylinders to overcome the loss of the anode field for some thereof due to the electrostatic shielding effects of the others. However, because of the open type of structure which this requires for all of the intermediate cathode elements, this type of arrangement does not provide cathode arrays of sufficiently high densities to afford high interaction incidences and therefore fails to afford substantially increased efficiencies. In other instances it was proposed to use solid concentric cylinders and to avoid physical blocking and electrical shielding by the use of multiple anodes strung between adjacent pairs of the cylinders in directions parallel to the axis of the array. These detectors have the disadvantage of entailing considerable stray capacitance between the total effective cathode and anode areas and of therefore reducing the maximum counting rate.

It is an object of the present invention to devise improvements in multiple plate detectors whereby they will have increased, and possibly their highest, counting efficiencies for radiation which impinges on their sides.

It is a further object to attain the object set forth above by devising multiple plate detectors employing arrays of concentric cathode elements without entailing the above-described disadvantages of prior art detectors employing such arrays.

In general these objects are attained by using solid, i. e., non-foraminous material to form cathode arrays of concentric elements such as cylinders or spheres, but mounting the plurality of fine wire anodes so that they extend radially through appropriately aligned rows of apertures toward the common axis (or center) of the array. In preferred embodiments means are employed, e. g., insulating beads located at each point where several convergent anodes come together, for preventing a glow discharge which starts on one anode from extending to another, thus shortening the dead time by preventing the entire volume of the detector from being disabled during each count.

In the drawing:

Fig. 1 represents a perspective view of a cylindrical embodiment of the invention which includes, along its length, three four-quadrant sections with half of its nearest end section cut away to show the nature of its internal structural arrangement; and Fig. 2 represents a perspective view of a spherical embodiment with its upper half cut away for the same purpose.

The detector 10 shown in Fig. 1 comprises a cathode array 11 of four concentric cylindrical elements, 12*a*–12*d*, and two circular end plates, the outline of one of which is represented by a dotted line at 13 in Fig. 1 and the other of which is not shown due to the fact that the foreground end of the detector is shown to be cut away. The end plates serve both as integral portions of the gas-tight envelope of the detector and as support means for maintaining the elements 12*a–d* in the desired mutually-spaced-apart relationship. Accordingly all of the elements 12*a–d* should preferably be cut to the same length and should have their opposite ends appropriately attached to the inside surfaces of the respective end plates 13 in any suitable way such as by soft or silver soldering and/or by hydrogen arc welding. Each of the cylindrical elements contains a plurality of apertures 14, each of which is in alignment with a corresponding aperture in each of the other elements to afford in the cathode array 11 a number of rows of apertures which are aligned with one another, preferably with the rows of apertures in any of the several sections into which the length of the detector may be subdivided being aligned along radii extending from several points symmetrically spaced apart around the periphery of the detector to a common point on its axis. Thus the circumferential dimension of the detector is divided into equal segments, e. g., quadrants in the example shown herein, each of the segments being provided with its own individual fine wire anode 15. Thus the volume of the detector 10 may be considered as divided into 12 independent subdivisions, each adapted to receive side-impinging radiation from a solid approach angle subtending a respective one third of its length and one fourth of its circumference and each having its own individual fine wire anode. Each anode 15 is supported axially of its associated row of aligned apertures 14 by having its ouside end fused into a glass bead 16 which in turn is fused to the periphery of the outer-most one of the row of apertures, i. e., to the aperture of the outer element 12*a*, while its inner end is connected to the common junction point of the group of anodes which converge with it on the axis of the detector. In making an embodiment, like that of Fig. 1, wherein the circumference of the detector is divided into an even number of subdivisions, it will be feasible in practice to mount a single piece of fine wire, which is as long as one diameter (rather than one radius) of the detector, tautly between two of the beads 16 so that it extends radially inwardly through one row of apertures to the tube's axis and then continues across the axis and extends radially outward through an opposite row of apertures. However, even in such a case the single length of wire would effectively serve as two anodes and, to this end, according to one feature of the invention its portion which traverses the axis of the detector is embedded in an element 17, such as a glass bead, which is common to all of the anodes which converge thereat and which, in the operation of the detector will serve to prevent a glow discharge which starts on any particular one of the convergent anodes from extending to any one or more of the others over their common point of juncture. For the element 17 to perform its intended function it is not necessary that the anodes be electrically isolated from, i. e., in insulating relationship to, each other. Instead all of the anodes shown herein are deliberately electrically interconnected via a common axially-positioned wire 18 so that the detector can be energized by simply connecting a source of high potential between the cathode array 11 and a single terminal pin 19, e. g., a pin afforded by extending the wire 18 through a glass bead (not shown) fused into a central hole in the end plate 13. If desired the wire 18 may be of appropriate thinness to serve as a Geiger-Mueller anode for the inner element 12*d* so that any quanta of penetrative radiation which happen to pass through all of the outer elements 12*a–c* and to interact with this inner one 12*d* may produce counts by causing Townsend discharges to the wire 18. However, if it be so desired for any reason, the wire 18 may be made much heavier than a normal Geiger-Mueller anode and/or can be covered with an insulating sleeve (not shown) to serve the purpose, similar to that of the elements 17, of preventing a glow discharge which originates in one section of the tube from extending to the anode(s) in one or more of the others.

A detector 10 of the kind shown in Fig. 1 is particularly suitable for use in bore hole logging for at least two reasons: (1) that it has its highest efficiency for radiation which, like that encountered in a bore hole, impinges predominantly on the sides of the detector; and (2) that its subdivision into segments, as contrasted to subdivision into sections along its length, is most effective for accomplishing the intended purpose of subdividing, namely, that of shortening the dead time, when, as in bore hole logging, the radiation to be measured approaches the detector in all radial directions over a solid angle of $4\pi$ steradians. Consider by way of contrast a situation in which the radiation to be measured emanates from a source which is located entirely on one side of a detector and therefore approaches the detector over a possibly rather small solid angle, which has its apex at the source and is subtended by the silhouette of the detector, e. g., by a rectangular area corresponding respectively in its width and length to the diameter and length of the detector. Since the length dimension of the detector may easily be the larger of the two, subdivision of the detector solely along that larger dimension, e. g., into subdivisions of the kind herein referred to as "sections," may suffice to effect a substantial improvement in the maximum attainable counting rate. However if the same detector were then totally surrounded by a source of radiation the average number of quanta to reach each section would increase by a factor corresponding to the ratio between the angle subtended by the width dimension of the detector as first used and the 360° included in an angle of $4\pi$ steradians, and the possibility that a given section might still be disabled, after registering a count, at the time of arrival of the next quantum would similarly increase. This is overcome in the present detector by subdividing it into segments, e. g., "quadrants" as well as sections. As a result the effective dead time of the detector taken as a whole is much shorter than that of any one of its subdivisions. As will be understood by those familiar with the art, the reason for this is that the (energizing) potential of the system of fine wire anodes can return to an operating level, after the registering of a count, in less than the interval of time required for quenching of the ionization in say the subdivision which produced the count. While this will not do any good if the next impinging quantum should just happen to penetrate the very same subdivision of the detector, more often than not it will do good since more often than not the next impinging quantum will penetrate some other subdivision.

Since the circumferences of the cathode elements progressively diminish in their inward order of succession, and therefore the distances along the inter-element spaces over which ionizing particles must be drawn into each anode's field become progressively shorter, it is possible for the inter-element spaces to be progressively thinner in the same order of succession, i. e., toward the axis of the detector. This is posible because the distances to which each anode's collecting field will need to penetrate into the inter-element spaces are progressively smaller for successively inwardly occurring spaces.

The concentric elements used in the cathode array 11*a* of the Fig. 2 embodiment are spheres (20*a*–20*d*) rather than cylinders. They are assembled and maintained in concentric spaced relationship by the use of a plurality of support rods 21 which, for reasons which will be obvious to those skilled in the art, should extend in radial directions in positions midway between locations of the nearest rows of apertures. When so positioned these support rods may be of such material and so connected to the elements 20*a*–*d* as to assume the same potential as the rest of the cathode array without this having any undesirable effects upon the field distribution within the detector when it is polarized for normal operation.

Despite the difference in appearance between this embodiment and that of Fig. 1, the manner in which they operate and the principles governing their manner of operation are very similar. Therefore it is believed unnecessary to describe again in detail parts which are used in both of these embodiments; bear the same reference numerals in the two figures which show them; and have already been fully described with respect to that of Fig. 1.

An added advantage which is offered by an embodiment of the kind shown in Fig. 2 over the kind shown in Fig. 1 is that it will be rather uniformly efficient for radiation reaching it from all directions of approach.

Obviously, many modifications and variations of the invention, as hereinbefore set forth, may be made without departing from the spirit and scope thereof, and therefore only such limitations should be imposed as are indicated in the appended claims.

I claim:

1. A radiation detector comprising an array of concentric and mutually spaced apart cathode elements having a plurality of rows of substantially radially aligned apertures, the surface of each of said elements defining a respective locus of points equidistant from a common center reference of the array, an ionizable gaseous filling in the inter-element spaces of the array, and a respective fine wire anode extending through and insulatingly supported centrally within each row of apertures.

2. A detector as in claim 1 in which said elements are spherical.

3. A detector as in claim 1 in which said elements are cylindrical.

4. A detector as in claim 3 in which groups of said fine wire anodes are convergent at different respective spaced-apart points along said axis whereby in effect the detector is divided into sections along its length and segments around its circumference.

5. A detector as in claim 1 in which at least some of said fine wire anodes are convergent at said reference, whereby the detector is in effect divided into segments, and which further comprises means located near the point of convergence of said anodes for preventing a glow discharge which may start in one of the segments from extending to one or more of the others thereof over said point of convergence.

References Cited in the file of this patent

UNITED STATES PATENTS

| | | |
|---|---|---|
| 2,397,072 | Hare | Mar. 19, 1946 |
| 2,445,305 | Hochgesang | July 13, 1948 |
| 2,604,600 | Neufeld | July 22, 1952 |
| 2,649,554 | Anton | Aug. 18, 1953 |
| 2,735,953 | Tirico | Feb. 21, 1956 |
| 2,738,431 | Herzog | Mar. 13, 1956 |

OTHER REFERENCES

Plain and Beaded Wire Geiger Counters, Parratt et al., Rev. of Sci. Ins. vol. 23, #1, January 1952, pp. 1–7.

Geiger Counter Tubes, Friedman, Proceedings of the I. R. E., vol. 37, #7, July 1949, pp. 803–804.